United States Patent
Smith et al.

(10) Patent No.: US 7,158,994 B1
(45) Date of Patent: Jan. 2, 2007

(54) OBJECT-ORIENTED MATERIALIZED VIEWS

(75) Inventors: Wayne Smith, Palo Alto, CA (US); Mahesh Subramaniam, Foster City, CA (US); Subramanian Muralidhar, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 438 days.

(21) Appl. No.: 10/006,605

(22) Filed: Dec. 5, 2001

Related U.S. Application Data

(60) Provisional application No. 60/326,275, filed on Sep. 28, 2001.

(51) Int. Cl.
*G06F 7/00* (2006.01)
*G06F 17/00* (2006.01)
*G06F 17/30* (2006.01)

(52) U.S. Cl. .............. 707/103 R; 707/2; 707/102
(58) Field of Classification Search ........... 707/1–5, 707/100–103, 200–203, 8, 10; 717/140
See application file for complete search history.

(56) References Cited

U.S. PATENT DOCUMENTS

| | | | |
|---|---|---|---|
| 5,261,098 A | 11/1993 | Katin et al. | |
| 5,276,870 A | 1/1994 | Shan et al. | |
| 5,404,506 A | 4/1995 | Fujisawa et al. | |
| 5,418,946 A | 5/1995 | Mori | |
| 5,444,842 A | 8/1995 | Bentson et al. | |
| 5,548,755 A | 8/1996 | Leung et al. | |
| 5,551,027 A | 8/1996 | Choy et al. | |
| 5,560,005 A | 9/1996 | Hoover et al. | |
| 5,581,758 A | 12/1996 | Burnett et al. | |
| 5,584,024 A | 12/1996 | Shwartz | |
| 5,594,899 A | 1/1997 | Knudsen et al. | |
| 5,598,559 A | 1/1997 | Chaudhuri | |
| 5,600,831 A | 2/1997 | Levy et al. | |
| 5,659,728 A | 8/1997 | Bhargava et al. | |
| 5,701,455 A | 12/1997 | Bhargava et al. | |
| 5,724,575 A | 3/1998 | Hoover et al. | |
| 5,729,730 A | 3/1998 | Wlaschin et al. | |
| 5,734,884 A | 3/1998 | Eberhard et al. | |
| 5,765,147 A | 6/1998 | Mattos et al. | |
| 5,774,692 A | 6/1998 | Boyer et al. | |
| 5,778,355 A | 7/1998 | Boyer et al. | |
| 5,812,840 A | 9/1998 | Shwartz | |
| 5,822,751 A | 10/1998 | Gray et al. | |
| 5,826,077 A | 10/1998 | Blakeley et al. | |
| 5,832,485 A | 11/1998 | Chaudhry | |
| 5,848,405 A | 12/1998 | Norcott | |

(Continued)

OTHER PUBLICATIONS

Harumi A. Kuno and Elke A. Rundensteiner (1996), Using Object-Oriented Principles to Optimize Update Propagation to Materizalized Views, pp. 310-317.*

(Continued)

*Primary Examiner*—Don Wong
*Assistant Examiner*—Merilyn Nguyen
(74) *Attorney, Agent, or Firm*—Hickman Palermo Truong & Becker LLP

(57) ABSTRACT

Techniques are provided for creating object-oriented materialized views. The object-oriented materialized views may be object materialized views or object-relational materialized views. The base tables may be object tables, object relational tables, or relational tables. The object-oriented materialized views may be refreshed, fully or incrementally. When an object-oriented materialized view is created, refresh code is generated for it. Through the use of object-oriented materialized views, users gain both the efficiency of materialized views and the power of the object-oriented paradigm.

28 Claims, 13 Drawing Sheets

U.S. PATENT DOCUMENTS

| | | | |
|---|---|---|---|
| 5,873,093 A | | 2/1999 | Williamson et al. |
| 5,875,447 A | | 2/1999 | Goel et al. |
| 5,897,632 A | | 4/1999 | Dar et al. |
| 5,950,210 A | | 9/1999 | Nelson |
| 5,956,706 A | | 9/1999 | Carey et al. |
| 5,960,426 A | | 9/1999 | Pirahesh et al. |
| 5,960,427 A | | 9/1999 | Goel et al. |
| 5,963,933 A | | 10/1999 | Cheng et al. |
| 5,970,482 A | | 10/1999 | Pham et al. |
| 5,974,407 A | | 10/1999 | Sacks |
| 5,974,416 A | | 10/1999 | Anand et al. |
| 5,978,788 A | | 11/1999 | Castelli et al. |
| 5,978,791 A | | 11/1999 | Farber et al. |
| 5,987,455 A | | 11/1999 | Cochrane et al. |
| 5,991,754 A | * | 11/1999 | Raitto et al. .................. 707/2 |
| 6,003,022 A | | 12/1999 | Eberhard et al. |
| 6,006,216 A | | 12/1999 | Griffin et al. |
| 6,023,695 A | | 2/2000 | Osborn et al. |
| 6,026,390 A | * | 2/2000 | Ross et al. ..................... 707/2 |
| 6,032,144 A | | 2/2000 | Srivastava et al. |
| 6,088,705 A | | 7/2000 | Lightstone et al. |
| 6,108,651 A | | 8/2000 | Guha |
| 6,125,360 A | | 9/2000 | Witkowski et al. |
| 6,134,543 A | | 10/2000 | Witkowski et al. |
| 6,199,063 B1 | | 3/2001 | Colby et al. |
| 6,272,502 B1 | * | 8/2001 | Lieuwen et al. ............ 707/203 |
| 6,334,128 B1 | * | 12/2001 | Norcott et al. .................. 707/5 |
| 6,339,769 B1 | * | 1/2002 | Cochrane et al. .............. 707/2 |
| 6,480,836 B1 | * | 11/2002 | Colby et al. ..................... 707/3 |
| 6,484,159 B1 | * | 11/2002 | Mumick et al. ................ 707/2 |
| 6,496,828 B1 | * | 12/2002 | Cochrane et al. ............. 707/10 |
| 6,546,402 B1 | * | 4/2003 | Beyer et al. ................. 707/201 |
| 6,741,997 B1 | * | 5/2004 | Liu et al. ..................... 707/102 |
| 7,007,006 B1 | | 2/2006 | Zilio et al. |

OTHER PUBLICATIONS

Harumi A. Kuno and Elke A Rundersteiner (1998), Incremental Maintenance of Materialized Object-Oriented Views in Multiview: Strategies and Performance Evaluation, pp. 768-792.*
Chenho Kung (1990), Object subclass hierarchy in SQL: A Simple Approach, pp. 117-125.*
Jixue Liu, Millist Vincent and Mukesh Mohania (1999), Incremental Maintenance of Nested Relational Views, pp. 197-205.*
Fawaz s. Al-Anzi and David L. Spooner (1994), Modeling Behavior, a Step Towards Defining Functionally Correct Views of Complex Objects in concurrent Engineering, pp. 1-9.*
Vivekanand Gpalkrishnan, Qing Li and Kamalakar Karlapalem (1998), Issues of Object-Relational view Design in Data Warehousing Environment, pp. 1732-2737.*
http://www.research.att.com/conf/vldb98/program.html, Mar. 2001.
http://www.research.att.com.conf/vldb98, Mar. 2001.
Bello et al., "Materialized Views in Oracle", VLDB '98, Proceedings of 24th International Conference on Very Large Data Bases, Aug. 24-27, 1998, New York City, New York, USA, pp. 659-664.
Tanjar et al., "Aggregate-join query processing in parallel database systems"; May 14-17, 2000; High Performance Computing in the Asia-Pacific Region, 2000, Proceedings, The Fourth International Conference/Exhibition on, vol. 2, pp. 824-829.
Proietti et al., "Analysis of range queries and self-spatial join queries on real region datasets stored using an R-tree"; Sep.-Oct., 2000; Knowledge and Data Engineering, IEEE Transaction, vol. 12, Issue 5, pp. 751-762.
Najjar et al., "Cardinality estimation of distributed join queries"; Sep. 1-3, 1999; Database and Expert Systems Applications, 1999, Proceedings, Tenth International Workshop on, pp. 66-70.
Chaudhuri, Surajit et al., "Optimizing Queries with Materialized Views", Proceedings of the Eleventh International Conference on Data Engineering, Mar. 6-10, 1995, pp. 190-200.

Gopalkrishnan, Vivekanand et al., "Issues of Object-Relational View in Data Warehousing Environment", 1998 IEEE International Conference on Systems, Man, and Cybernetics, Oct. 11-14, 1998, vol. 3, pp. 2732-2737.
Kuno, Harumi et al., "Augmented Inherited Multi-Index Structure for Maintenance of Materialized Path Query Views", Proceedings of the Sixth International Conference on Research Issues in Data Engineering, Feb. 26-27, 1996, pp. 128-137.
Segev, Arie et al., "Maintaining Materialized Views in Distributed Databases", Proceedings of the Fifth International Conference on Data Engineering, Feb. 6-10, 1989, pp. 262-270.
Bhargava, Gautam et al., "Hypergraph based reorderings of outer join queries with complex predicates", Proceedings of the 1995 ACM SIGMOND International Conference on Management of Data and Symposium on Principles of Database Systems , May 22-25, 1995, AC.
Bhagrava, Gautam et al., "Efficient processing of outer joins and aggregate junctions", Proceedings of the Twelfth International Conference Data Engineering, 1996., Feb. 26-Mar. 1, 1996, pp. 441-449.
Biggs, Maggie, "Oracle8 still in pole position", InfoWorld, Framingham; Dec. 15, 1997, vol. 19, Issue 50, p. 1, 97, ISSN: 01996649.
Chen, Arbee, "Outerjoin Optimization in Multidatabase Systems", Proceedings of the Second International Symposium on Databases in Parallel and Distributed Systems, 1990, Jul. 2-4, 1990, pp. 211-218.
Pang, HweeHwa et al., "Partially Preemptble Hash Joins", Proceedings of the 1993 ACM SIGMOND international conference on Mangement of data, 1993, pp. 59-68.
Ross, Kenneth et al., "Materialized view maintenance and integrity constraint checking: trading space for time", Proceedings of the 1996 ACM SIGMOND international conference on Mangement of data, Jun. 3-6, 1996, pp. 447-458.
O'Neil et al., "Multi-Table Joins Through Bitmapped Join Indices", SIGMOND Record, vol. 24, No. 3, Sep. 1995, pp. 8-11.
Yan, Weipeng et al., "Performing Group-By before Join", Proceedings of the 10th International Conference on Data Engineering, 1994, Feb. 14-18, 1994, pp. 89-100.
Lee, Byung Suk et al., "Outer joins and filters for instantiating objects from relational databases through views", IEEE Transactions on Knowledge and Data Engineering, Feb. 1994, vol. 6, Issue 1, pp. 108-119.
Lo, Ming-Ling et al., "Spatial Hash-Joins", Proceedings of the 1996 ACM SIGMOND International Conference on Management of Data, 1996, pp. 247-258.
Marek, Robert et al., "TID Hash Joins", Proceedings of the third international conference in Information and knowledge management, 1994, No. 2-, Dec. 2, 1994, pp. 42-49.
Mishra, Priti et al., "Join Processing in Relational Databases", ACM Computing Surveys, vol. 24, No. 1, Mar. 1992, pp. 63-113.
Liu et al., "Derivation of incremental for nested relations", Database Conference, 2001, ADC 2001, Proceedings, 12th Australasian, Jan. 2001, pp. 76-82.
Moro et al., "Incremental maintenance of multi-source views", Database Conference, 2001, ADC 2001, Proceedings, 12th Australasian, Jan. 2001, pp. 13-20.
Ling et al., "A model for evaluating materialized view maintenance algorithms", Web Information Systems Engineering, 2000, Proceedings of the First International Conference on, vol. 1, Jun. 2000, pp. 374-382.
Jajoda et al., "Polyinstantiation integrity in multilevel relations"; May 7-9, 1990; Research in Security and Privacy, 1990, Proceedings, 1990 IEEE Computer Society Symposium on, pp. 104-115.
Strocker et al., "Integrating semi-join-reducers into state-of-the-art query processors"; Apr. 2-6, 2001; Data Engineering 2001, Proceedings 17th International Conference on, pp. 575-584.
Schewe, "On the unification of query algebras and their extension to Rational Tree Structures"; Jan. 29-Feb. 2, 2001; Database Conference, 2001, ADC 2001, Proceedings, 12th Australasian, pp. 52-59.

Rao et al., "Using EELs, a practical approach to outerjoin and antijoin reordering"; Apr. 2-6, 2001; Data Engineering, 2001, Proceedings, 17th International Conference on, 585-594.

Weilbrauch, "DBS for OS/390 V5 vs. V6 outer join performance3"; Apr. 24-25, Apr. 2000; Performance Analysis of Systems and Software, 2000, IEEE International Symposium on, pp. 46-51.

Scheurmann et al., "Query processing in multidatabase systems"; Oct. 18-21, 1992; Systems, Man and Cybernetifcs, 1992 IEEE International Conference on, vol. 2, pp. 1250-1254.

* cited by examiner

PERSONS

| FIRST_NAME_P | LAST_NAME_P | ADDRESS_P |
|---|---|---|
|  |  |  |
|  |  |  |
|  |  |  |
|  |  |  |
|  |  |  |
|  |  |  |
|  |  |  |

FIG. 2

PERSON_ADDRESSES 310

| STREET 212 | CITY 213 | STATE 214 | ZIP 215 | OBJECT_ID_PA 216 |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |

ROWS 320

FIG. 3

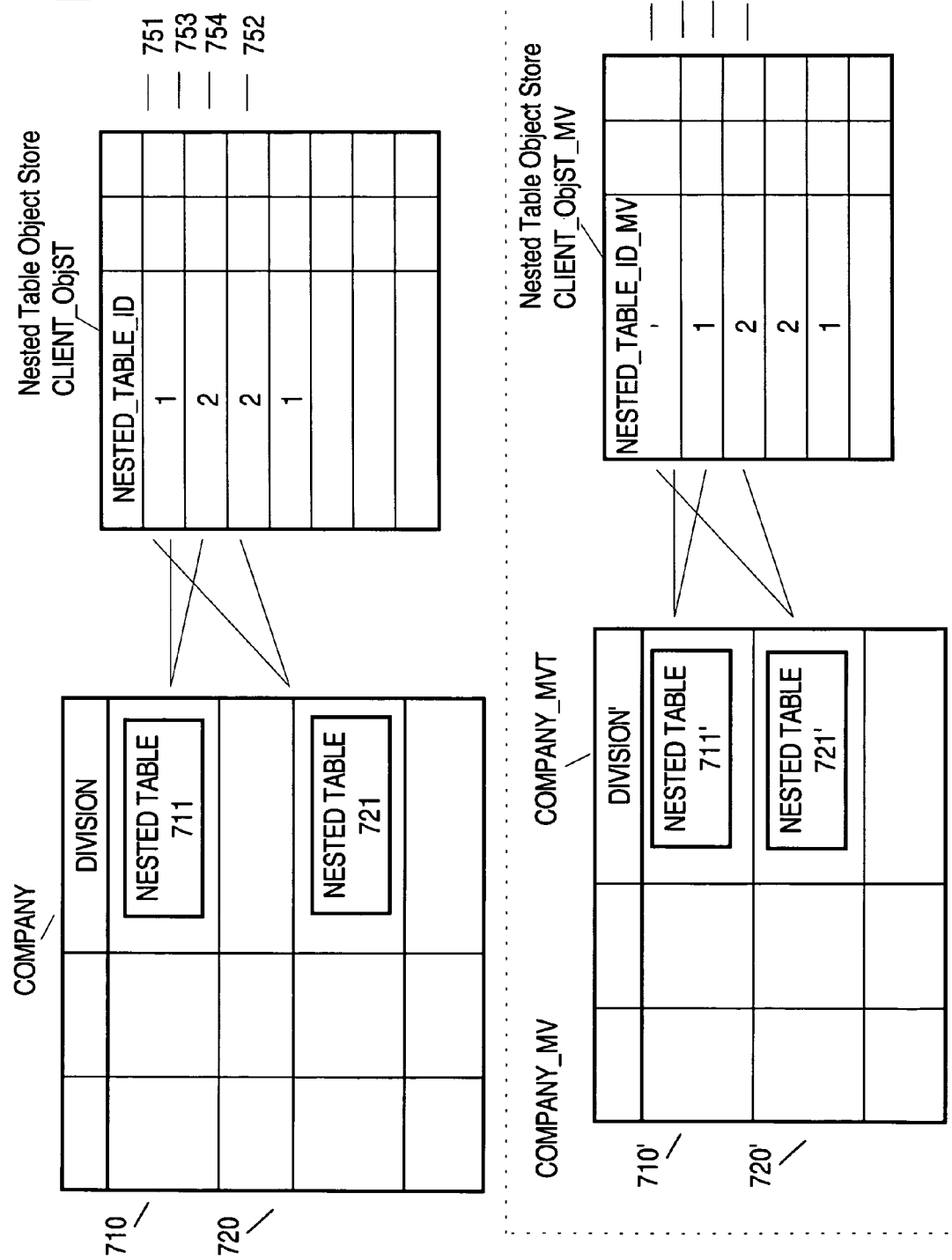

US 7,158,994 B1

OBJECT-ORIENTED MATERIALIZED VIEWS

RELATED APPLICATION

The present invention claims priority to U.S. Provisional Patent No. 60/326,275, entitled Object Oriented Materialized Views, filed on Sep. 28, 2001, the contents of which are incorporated herein by reference.

The present invention relates to U.S. Pat. No. 6,134,558, entitled References That Indicate Where Global Database Objects Reside, issued Oct. 17, 2000 to Chin-Heng Hong, et al., the contents of which are incorporated herein by reference.

The present invention is related to U.S. Pat. No. 6,289,335, entitled Fast Refresh Of Snapshots Containing Subqueries, issued to Alan Downing, et al. on Sep. 11, 2001, the contents of which are hereby incorporated by reference. The present invention relates to U.S. Pat. No. 6,061,690, entitled Apparatus and Method for Storage of Object Collections in a DBMS, issued on May 9, 2000 to Anil Nori, et al., the contents of which are incorporated herein by reference.

FIELD OF THE INVENTION

This application is related to database systems, and in particular, to creating and maintaining materialized views.

BACKGROUND OF THE INVENTION

A relational database management system (DBMS) allows entities to be modeled according to the relational paradigm, where entities are modeled in terms of tables with columns and rows. Each row contains a value for each column, thereby establishing a relation between the values in the columns. The related values in each of the rows are used to model entities.

For example, a relational table FRIENDS may be used to model persons who are friends. Each row in the relational table FRIENDS represents one friend. Each column of a relational table can represent a characteristic of a friend. Assume one column of the relational table FRIENDS is NAME, and another is SOCIAL SECURITY NUMBER. One row in FRIENDS contains the value of "John Doe" for the NAME column and the value of "999-99-9999" for the SOCIAL SECURITY NUMBER column.

An object-oriented DBMS allows entities to be modeled according to the object-oriented paradigm, where entities are modeled as instances of an object class. An object class is associated with one or more attributes and zero or more methods. The attributes of an object class are specified by a user. These data types include primitive data types, other object classes, or collections. Instances of an object class are known as "objects". Each object contains values for its attributes. The values of the attributes are collectively referred to as the object's state. Each object that is an instance of a particular object class has the same attributes. The methods associated with an object (i.e. methods associated with the object class of the object) operate upon the state of an object. Methods associated with an object class are may also be referred to herein as routines.

Object-oriented DBMSs may contain object tables, which are tables that contain objects. Each object in an object table belongs to the same object class. For each attribute of the object class, an object table has a corresponding "attribute column" that holds values for the attribute. Each row of an object table holds the attribute values of an instance of the object class.

For example, an object class STUDENT may define several attributes for objects which represent students. Assume one attribute is NAME and another is SOCIAL SECURITY NUMBER. Further assume that object table UNDERGRAD contains objects belonging to Person. One column in Person corresponds to the NAME attribute, another column corresponds to the SOCIAL SECURITY NUMBER attribute. Each row in UNDERGRAD contains attribute values for one object.

An object-oriented DBMS may also contain object-relational tables. An object-relational table contains at least one object column that contains an object of a particular object class.

Object-oriented DBMSs offer many advantageous features not offered by relational databases. One such feature is the ability to create multiple object tables with identical columns without having to create, for each table, a separate set of identical definitions for the columns. For example, it may be desirable to create two tables with identical columns, each having a NAME column and a SOCIAL SECURITY NUMBER column. In object-oriented DBMSs, the creation of these tables can be achieved by defining one object class, such as Person, having the two attributes NAME and SOCIAL SECURITY NUMBER. Then two object tables, UNDERGRAD and GRAD, can be defined as tables having objects belonging to STUDENT. It is only necessary to define the attribute of STUDENT once to create any number of object tables (e.g., UNDERGRAD and GRAD) with columns that correspond to those attributes.

On the other hand, creating two tables analogous to the above two tables using a relational database requires two separately stored table definitions, each having their own separate column definitions. Each table definition has to be separately entered by a user.

Another advantage is that methods that are associated with an object class may be invoked to perform operations that operate on any object that is an instance of the object class. Thus, methods associated with object class STUDENT may invoked to perform operations upon objects in the object tables UNDERGRAD or GRAD.

Object-oriented DBMSs offer many other advantages of the object-oriented paradigm. Thus, object-oriented DBMS provide the power and simplicity of object-oriented programming to DBMS users and developers.

Materialized Views

A materialized view is a body of data constructed from "base" data stored in one or more "base" tables. A base table may be local or remote relative to the materialized view. A materialized view can be refreshed on a periodic basis to reflect the current state of its corresponding base tables.

One type of materialized view is a snapshot. A snapshot is a materialized view that may be constructed from a portion of the base data. Snapshots are useful for replicating a portion of the base data for a user who only needs to view or access that portion. For example, sales associates are assigned territories by zip code, and they would like to keep a copy of only the relevant sales information in a database on their laptop computers. Thus, if a sales associate Smith is assigned only to zip codes 1955 and above, then Smith is only interested in customers, orders, and order lines for zip code 1955 and above. Consequently, Smith creates a snapshot that reflects only base data relevant to his zip code.

Snapshots are distinguished from other types of materialized views in that snapshots are brought up-to-date with respect to the base tables in response to initiation of an explicit refresh command. This explicit refresh command usually comes from a user, but may be periodically generated in the background by a computer system after a prescribed amount of time or after a prescribed number of logged entries. This feature of snapshots is particularly useful for laptop computers, which are only occasionally connected to a main database system housing the master tables.

Another use of materialized views is to store the results of often-repeated queries in materialized views. For example, a business may periodically generate reports that summarize the business facts stored in a data warehouse, such as: "What have been the best selling brands of soft drinks in each of our sales regions, during the past six months?". By storing the results of queries in a materialized view, the costly join operations required to generate the results do not have to be performed every time the queries are issued. Rather, the database server responds to the queries by simply retrieving pre-computed data in the materialized view. Through a process known as query rewrite, a query can be optimized to recognize and use existing materialized views that could answer the query. Thus rewritten queries can be executed more efficiently.

The contents of a materialized view are defined by metadata referred to as a view definition. The view definition contains mappings to one or more columns in the one or more tables containing the data. Typically, the view definition is in the form of a database query specified in the request to create the materialized view.

Such requests often take the form of a data definition language command ("DDL") which are issued to a DBMS to modify the configuration of a DBMS, to define, for example, the database objects in the DBMS, and the attributes of the database objects. DDL commands, like any database command, must conform to a language recognized by a DBMS, such as SQL.

To illustrate a DDL command that may be issued by a user to create a materialized view, the following DDL command QCOMV is provided. QCOMV defines a materialized view ORDERS_MV of table ORDER.

create materialized view ORDERS_MV as select ORDER_DATE,

CUSTOMER_NAME,

TOTAL_AMOUNT from ORDER

QCOMV specifies the query that defines the materialized view, which is 'select ORDER_DATE, CUSTOMER_NAME, TOTAL_AMOUNT From ORDER'. The query that defines the materialized view is herein referred to as the materialized query. The materialized query in QCOMV defines ORDER_MV as having columns ORDER_DATA, CUSTOMER_NAME, and TOTAL_AMOUNT.

Columns and tables that are mapped to a materialized view are referred to herein as base columns and base tables of the materialized view, respectively. The data contained in a materialized view is referred to herein as materialized data.

Materialized data for a materialized view is typically stored in a "container" table. The container table contains a column for each column defined for a materialized view. Container tables may contain "hidden" columns used to support their use as containers for materialized views. Some hidden columns may be used to support refresh operations. In addition, some materialized views require the use of multiple container tables.

Materialized Views not Supported for Different Database Paradigms

Conventional DBMSs do not support materialized views of object tables or object relational tables. The lack of support of materialized views often imposes a dilemma upon developers of a database application—they must choose between the advantages of materialized views and the power of the object-oriented paradigm. Clearly, it desirably to provide a system that supports both.

SUMMARY OF THE INVENTION

Techniques are provided for creating object-oriented materialized views. According to an aspect of the present invention, the object-oriented materialized views may be object materialized views or object-relational materialized views. The base tables may be object tables, object relational tables, or relational tables. The object-oriented materialized views may be refreshed, fully or incrementally. When an object-oriented materialized view is created, refresh code is generated for it. Through the use of object-oriented materialized views, users gain both the efficiency of materialized views and the power of the object-oriented paradigm.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram of an object-relational table according to an embodiment of the present invention;

FIG. 3 is a block diagram of an object table according to an embodiment of the present invention;

FIG. 7C is a block diagram depicting an object-relational table containing nested tables, a table used to store nested table objects, and an object-relational materialized view of the object-relational table.

DETAILED DESCRIPTION OF THE INVENTION

A method and apparatus for object-oriented materialized views is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Techniques are provided for creating object-oriented materialized views. The object-oriented materialized views may be object materialized views or object-relational materialized views. Base tables may be object tables, object relational tables, or relational tables. The object-oriented materialized views may be refreshed, fully or incrementally. The techniques are illustrated using the illustrative DBMS illustrated in FIG. 1.

Figure 1:
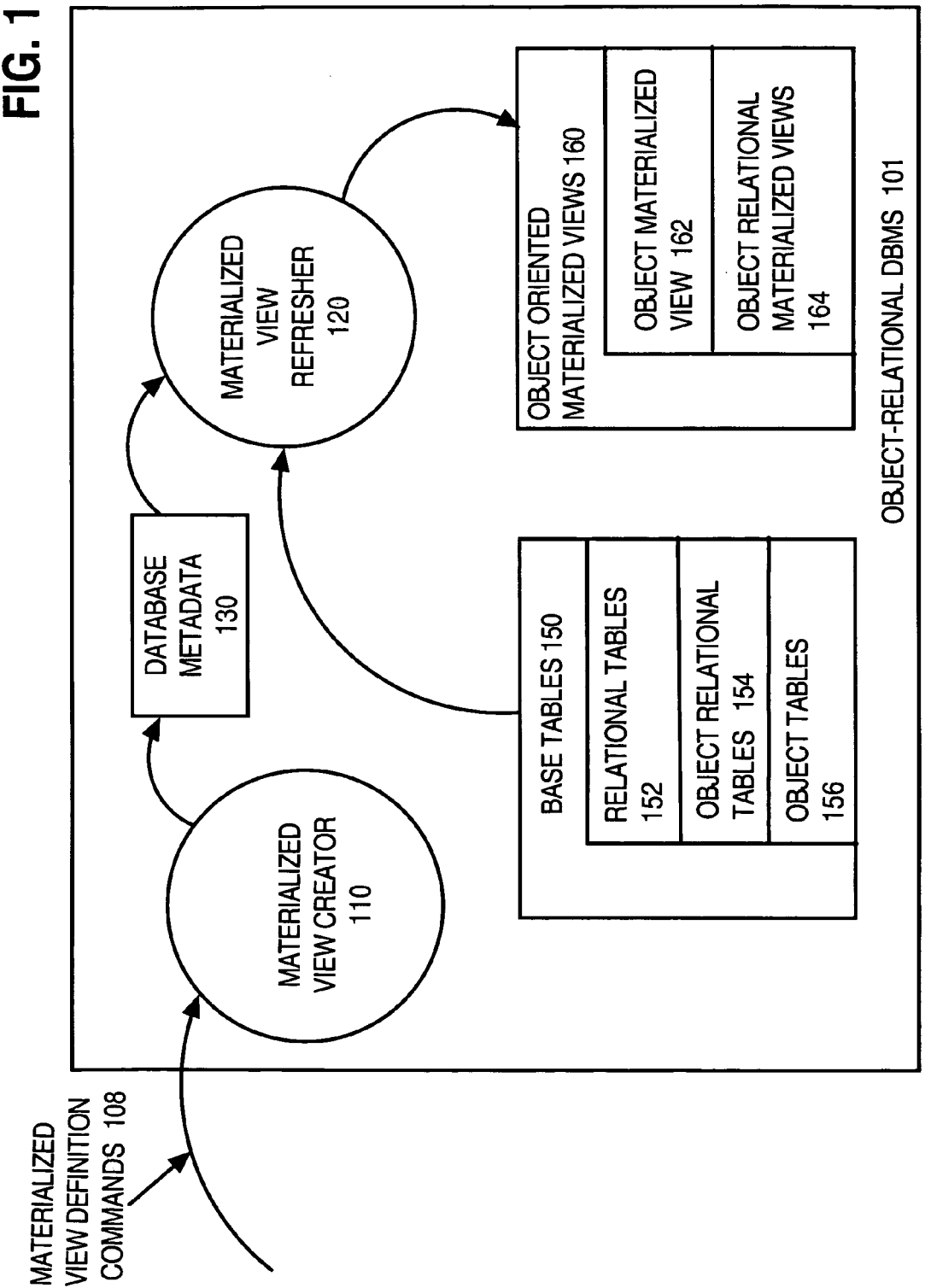
FIG. 1 is a block diagram of an object-relational DBMS according to an embodiment of the present invention.

FIG. 1 is a block diagram depicting a DBMS architecture that may be used to implement techniques for creating and maintaining object-oriented materialized views. Referring to FIG. 1, it shows object-relational DBMS 101 and various components of it that are involved in creating and maintaining object-oriented materialized views. Object-relational DBMS 101 includes materialized view creator 110, database metadata 130, materialized view refresher 120, base tables 150, and object-oriented materialized views 160. Materialized view creator 110 generally represents one or more processes within object-relational DBMS 101, that are responsible for creating materialized views according to requests issued by users to create the materialized views. Materialized view creator 110 receives materialized view definition commands 108, which define materialized views. Materialized view creator 110 analyzes the commands and creates the materialized view accordingly. The processes followed by materialized view creator 110 to create a materialized view shall be described in greater detail.

Database metadata 130 is metadata that describes the configuration of a DBMS. Database metadata 130 defines, for example, database objects such as tables, indexes for tables, and materialized views. Database metadata 130 is generated by object-relational DBMS 101 in response to receiving DDL commands, such as a materialized view definition commands 108.

Base tables 150 are a collection of base tables for object-oriented materialized views 160. Base tables 150 include relational tables 152, object-relational tables 154, and object tables 156.

Other base tables for object-oriented materialized views may reside on DBMSs other than object-relational DBMS 101.

Object-relational DBMS 101 defines an object class in response to receiving DDL commands that define the object class. To define an object class, object-relational DBMS 101 generates metadata defining the object class and stores the metadata in database metadata 130.

Figure 2:
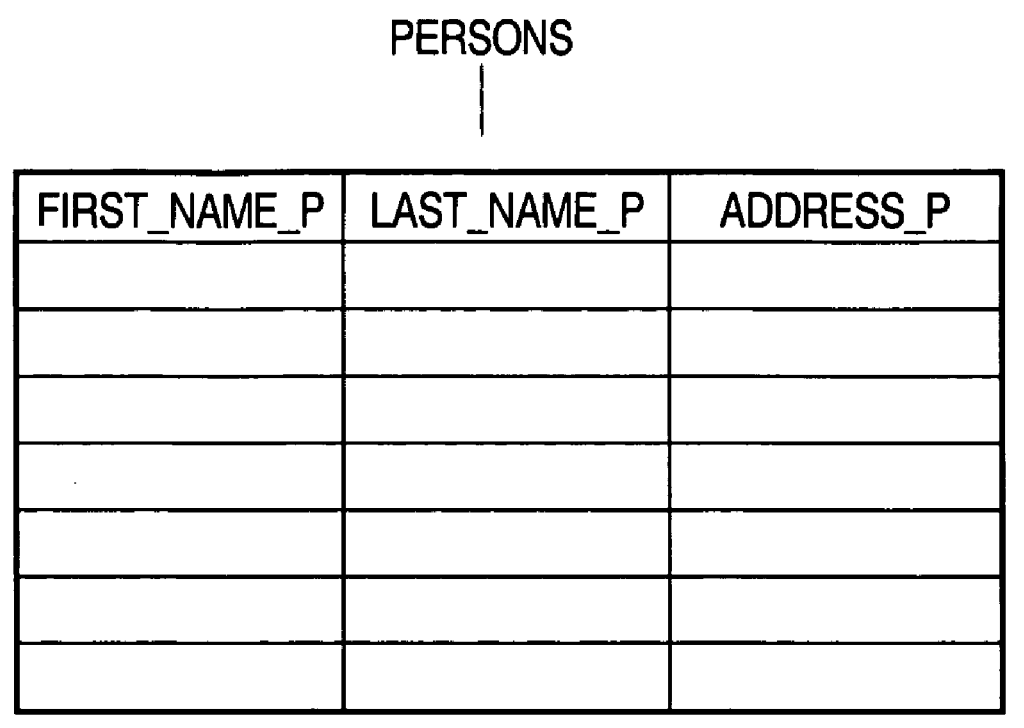

To illustrate an object-relational table, FIG. 2 is provided. FIG. 2 is a diagram showing base table PERSONS. PERSONS contains columns FIRST_NAME_P, LAST_NAME_P, and ADDRESS_P. ADDRESS_P is defined as an object column of the object class Address. The object class Address is defined according to the following database command DBCA.

Create type Address as object
(Street varchar2(30),
City varchar2 (10),
State varchar2(2),
Zip number
)

Database command DBCA defines four attributes for object class Address: Street, City, State, and Zip. Street, City and State are of the type varchar, a string; Zip is of the type number.

To illustrate an object table, FIG. 3 is provided. FIG. 3 is a block diagram showing object table PERSON_ADDRESSES. PERSON_ADDRESSES holds column objects of the object class Address. PERSON_ADDRESSES has columns STREET 212, CITY 213, STATE 214, and ZIP 215, which respectively correspond to Street, City, State, and Zip attributes of object class Address. Please note that reference numerals are used to reference diagramed items which may be similarly named to other items described herein. PERSON_ADDRESSES contains rows 320. A value in a column of a row from rows 320 holds a value for the attribute corresponding to the column. Each row of rows 320 is an object instance of the object class ADDRESS.

PERSON_ADDRESSES also holds object id column OBJECT_ID_PA. An object id is a value that uniquely identifies an object relative to a group of objects. The group of objects may be those objects contained in a set of base tables that reside in a DBMS, or those objects contained in a set of base tables that reside in a group of DBMSs. A value in column OBJECT_ID_PA of a row from rows 320 uniquely identifies the object contained by the row relative to objects contained in a set of base tables.

Object-oriented materialized views 160 include object materialized views 162 and object-relational materialized views 164. The container tables for object materialized views 162 are object tables, and the container tables object-relational materialized views 164 are object-relational tables.

Refreshing Materialized Views

As new data is periodically added to the base tables of a materialized view, the materialized view is updated to reflect the new base data. One approach to refreshing materialized views is referred to as the "full refresh", "total refresh", or "complete refresh" approach. According to the full refresh approach, the values in a materialized views are recalculated based on all of the base data every time new base data is supplied. Systems that employ the full refresh approach have the disadvantage that the re-creation process can be a relatively lengthy operation due to the size and number of tables from which the materialized data is derived. For example, when ten new rows are added to a particular base table that contains a million rows, a total refresh operation would have to process all one million and ten rows of the base table to regenerate the materialized views derived using the base table.

The process of updating materialized data may be improved by performing incremental refresh, where rather than generating a new set of materialized data based on calculations that use all of the base data, the materialized data is updated based on just the new or changed base data.

Object-oriented materialized views 160 are refreshed by materialized view refresher 120. Materialized view refresher 160 is one or more processes executing software components of object-relational DBMS 101 that are responsible for refreshing materialized views. Materialized view refresher 120 leverages refresh mechanisms for refreshing relational materialized views, as shall be described in greater detail.

Materialized View Creator

To create a materialized view, materialized view creator 110 performs a variety of tasks. These include parsing and analyzing a materialized view command to determine the columns the command defines, determining the structure of the container tables for the materialized view, and generating the DDL commands needed to create the container table(s). Materialized view creator 110 issues these DDL commands to object-relational DBMS 101, that is, issues the DDL commands to other components of object-relational DBMS 101 that create the container tables in response to those commands.

Another task performed by materialized view creator 110 is generating refresh code. Refresh code is code executed by materialized view refresher 120 to refresh a materialized view. Refresh code may consist of database commands that specify operations for loading data from the base tables and for modifying the materialized view. Once the refresh code is generated, it is stored in database metadata 130, where it is accessed by materialized view refresher 120 to be executed to refresh a materialized view.

Two types of refresh code may be generated: (1) full refresh code, which specifies operations for a full refresh, and (2) incremental refresh code, which specifies operations for an incremental refresh. Generally, full refresh code is generated for all materialized views, even those that are incrementally refreshed, to subsequently refresh the materialized view when it is not or can not be incrementally refreshed.

Incremental refresh code is generated for a materialized view when (1) the DDL command received by object-relational DBMS 101 to define the materialized view, and (2) the materialized view satisfies incremental refresh criteria. Not all types of materialized views are incrementally refreshed. For example, some DBMSs cannot incrementally refresh a materialized view defined by a materialized view query that joins two tables based on a many-to-many relationship.

Materialized view creator 110 analyzes the requested materialized view definition to determine whether it satisfies incremental refresh criteria. Incremental refresh criteria could be that the materialized view is not be based on a many-to-many join. If the materialized view satisfies incremental refresh criteria, then incremental refresh code is generated and stored in database metadata 130.

Materialized views that are incrementally refreshed are referred to as fast refreshable materialized views. Materialized views that are not incrementally refreshed are referred to as fully refreshed materialized views.

Materialized View Creator 110's Object-Oriented Capabilities

Object-oriented materialized views 160 are defined by DDL commands whose syntax specify objected oriented features. Thus to support creation and management of object-oriented materialized views, materialized view creator 110 must be capable of interpreting, analyzing, and carrying out DDL commands that define object-oriented features. For example, a DDL command may define a materialized view that has an object column of a particular object class. To analyze the DDL command, materialized view creator 110 needs to be able to recognize and decipher object classes specified by the DDL command and to analyze each of their attributes. The ability of materialized view creator 110 to analyze object-oriented syntax in DDL commands to create objected oriented materialized views sets it apart from conventional systems that create materialized views.

Another reason materialized view creator 110 needs the ability to recognize and analyze object-oriented syntax is due to the nature of the incremental refresh code generated by materialized view creator 110. When materialized view creator 110 generates incremental refresh code for an object-oriented materialized view, it generates refresh code that specifies operations at the relational level of abstraction, not at the object-oriented level of abstraction. To explain what it means to specify operations at the relational or object-oriented level of abstraction, and why this requires the ability to analyze object-oriented syntax, it is useful to explain how object-relational DBMS 101 internally represents object-relational tables.

Figure 4:
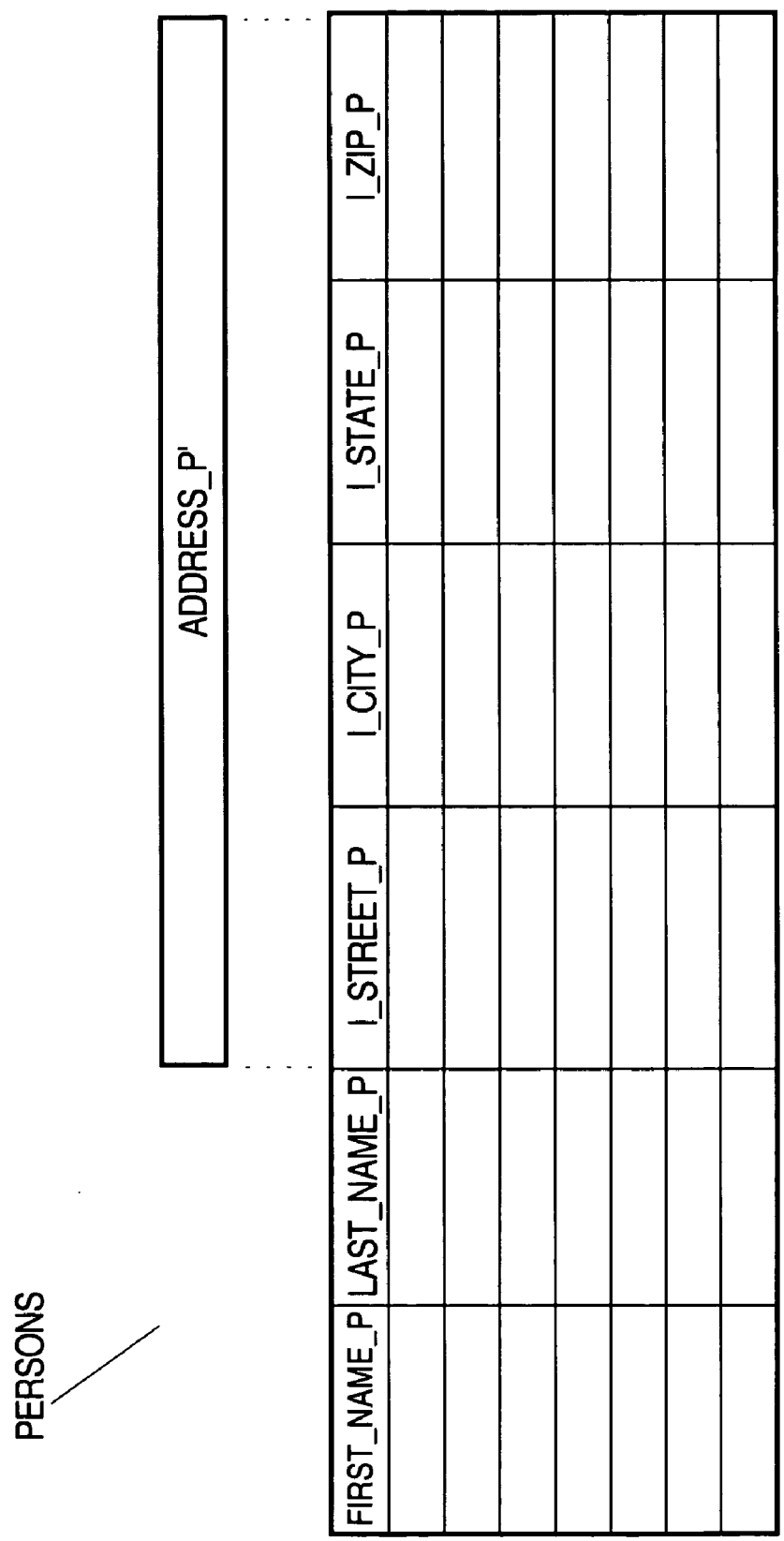
FIG. 4 is an internal implementation of an object-relational table according to an embodiment of the present invention.

FIG. 4 is a block diagram depicting the internal structure of PERSONS. The internal structure is referred to as being "internal" because it includes private elements that may not be directly exposed to or accessed by the user, as shall be explained in greater detail.

Referring to FIG. 4, object-relational DBMS 101 defines ADDRESS_P as virtual column ADDRESS_P', described in greater detail below. "Internal columns" I_STREET_P, I_CITY_P, I_STATE_P, I_ZIP_P, hold the attribute values for column objects stored in ADDRESS_P. Specifically, I_STREET_P, I_CITY_P, I_STATE_P, I_ZIP_P hold the attribute values for the attributes Street, City, State, and Zip, respectively.

A "virtual" column is a column for which no user data or attribute values are separately stored. As with other types of columns, for virtual columns database metadata 130 includes "column" metadata that defines various properties of the columns, including, for example, its data type or format. For virtual columns, the column metadata specifies how data from other columns or sources are generated for the virtual column. The "column" metadata for ADDRESS_P specifies the correspondence between ADDRESS_P's object class attributes and the internal columns that hold the attribute values. For example, the column metadata for ADDRESS_P specifies the I_CITY_P holds the attribute values for attribute City for ADDRESS_P.

Object Level Versus Relational Level

Database commands specify the database operations for the database server to perform. Operations are specified at an "object level" when the database command used to specify the operations references one or more objects. The following query QOL illustrates a query specified at the object level.

Select ADDRESS_P.Zip From PERSON

Query QOL specifies operations at the object level because its Select-clause references the Zip attribute of the column objects in ADDRESS_P. Database commands that specify operations at the object level are referred to herein as object level commands.

The following query QOR illustrates a query specified at the "relational level."

Select I_ZIP_P From PERSON

Query QOR specifies operations at the relational level because its Select-clause references I_ZIP_P as a column in a table, and not as an attribute of an object. Database commands that specify operations at the relational level are referred to herein as relational level commands.

In general, object-relational DBMS 101 processes database commands specified at the relational level more efficiently. This is a reason why materialized view creator 110 generates incremental refresh code at the relational level. It is especially important that the refresh code be efficient because the code may be executed during peak hours, and may even be executed after every execution of a database transaction.

It should be noted that if a user submits a database command referencing an internal column (e.g. QOR) to object-relational DBMS 101, object-relational DBMS 101 does not process the query because the column is not exposed to users. That is, the database commands from a user are not permitted to explicitly reference an internal column.

Process for Creating and Initially Populating Materialized Views

Figure 5A:
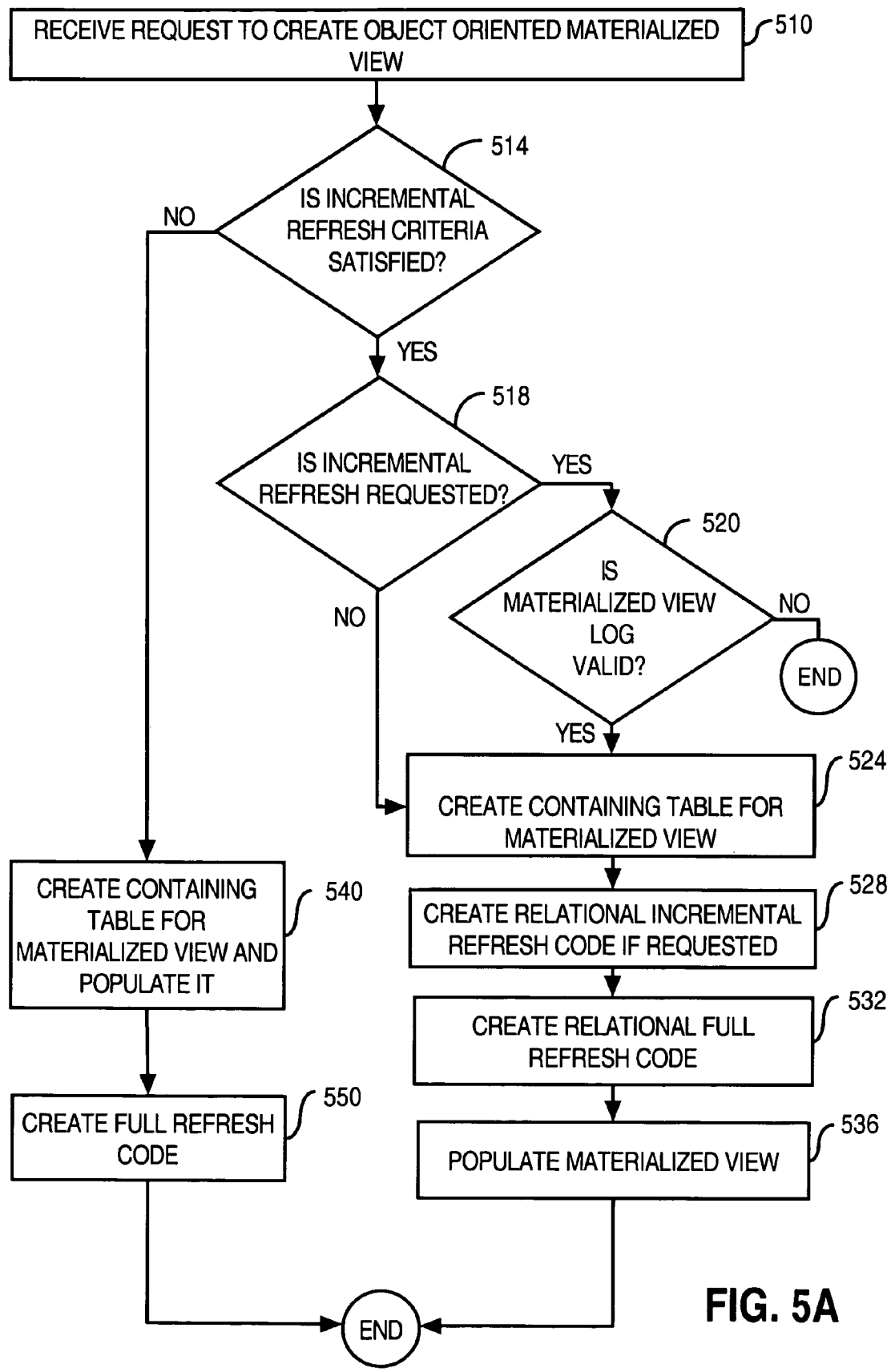
FIG. 5A is a flowchart depicting a process for creating a materialized view according to an embodiment of the present invention.

FIG. 5A shows a flowchart depicting a process followed by object-relational DBMS 101 to create a materialized view and to initially populate it. The process is illustrated using the database objects shown in FIG. 5B.

Figure 5B:
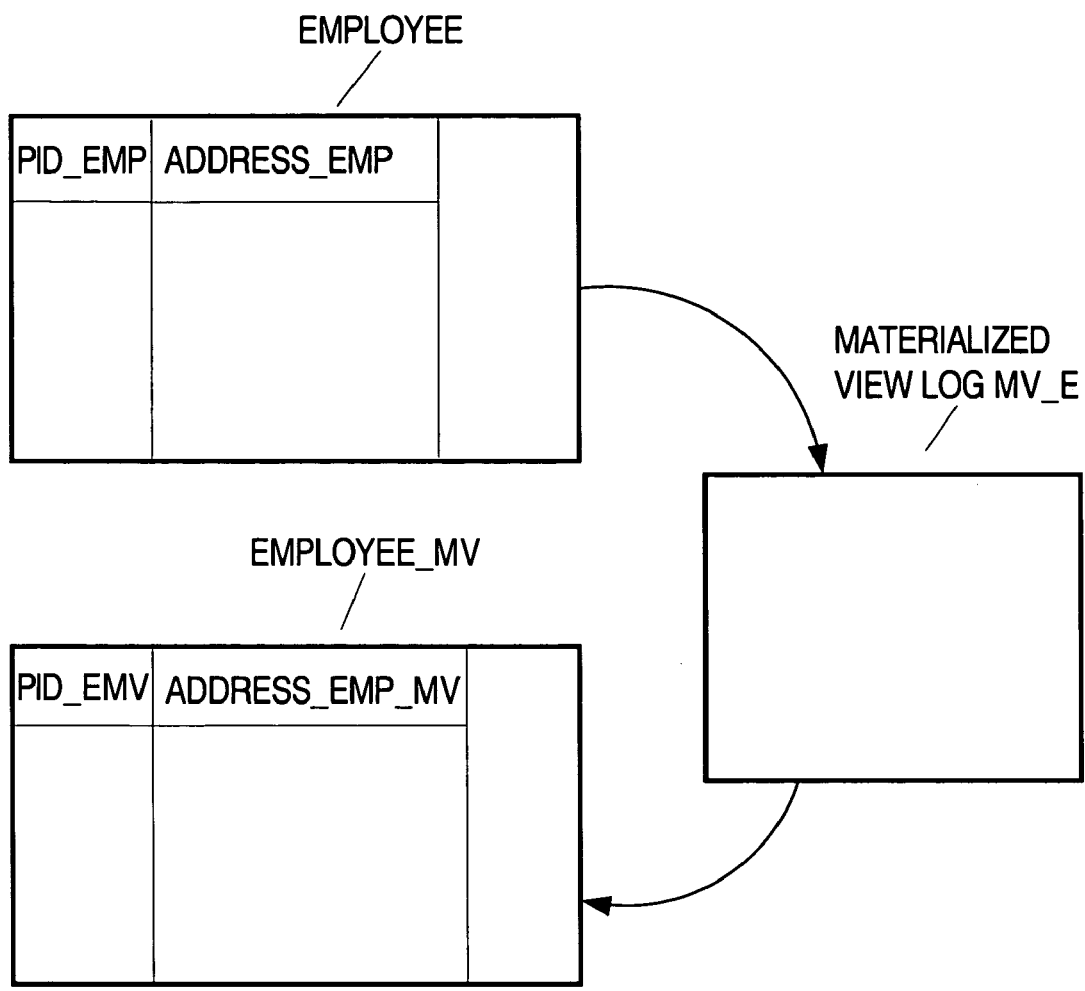
FIG. 5B is a block diagram depicting a base table, object-relational materialized view, and materialized view log according to an embodiment of the present invention.

Referring to FIG. 5B, it shows table EMPLOYEE. EMPLOYEE is an object-relational table that includes various columns. These include ADDRESS_EMP, which is an object column of the object class Address, and PID_EMP, which contains values that uniquely identify a person (i.e. employee). Other columns of EMPLOYEE are not shown.

EMPLOYEE is a base table for object-relational materialized view EMPLOYEE_MV. Column ADDRESS_EMP in EMPLOYEE is a base column corresponding to ADDRESS_EMP_MV in EMPLOYEE_MV. Likewise, column PID_EMP is a base column for PID_EMV. For purposes of exposition, container tables are referred to as materialized views, when one container is used for the materialized view.

MV_E log is a materialized view log. A materialized view log is a table created by a DBMS to track changes to base tables. As mentioned before, incremental refresh mechanisms, such as materialized view refresher 120, update materialized views based on changes that occurred since the last refresh of the materialized view. A materialized view log is used to determine what those changes are.

A materialized view log is created by object-relational DBMS 101 in response to receiving a DDL command requesting a materialized view log for a particular table. The following DDL database command QMVLOG may be used to create MV_E log.

create materialized view log on EMPLOYEE

Object-relational DBMS 101 creates metadata in database metadata 130 to define materialized view log MV_E. The metadata associates EMPLOYEE with MV_E as a materialized view log for EMPLOYEE.

The process shown in FIG. 5A for creating and initializing a materialized view is illustrated using EMPLOYEE, EMPLOYEE_MV, and MV_E log. EMPLOYEE_MV can be created at various stages of the execution of the process.

Referring to FIG. 5A, at step 510, materialized view creator 110 receives a request to create an object-oriented materialized view. For purposes of illustration, the following DDL command QEMV is received.

create materialized view EMPLOYEE_MV REFRESH COMPLETE as select ADDRESS_EMP ADDRESS_EMV [list of columns]
from EMPLOYEE The clause [list of columns] refers to other columns defined by QEMV for table EMPLOYEE.

At step 514, it is determined whether the requested materialized view satisfies incremental refresh criteria. If the incremental refresh criteria is satisfied, execution of the steps proceeds to step 518.

At step 518, it is determined whether an incremental refresh is requested. A request to create a materialized view may specify whether the materialized view is to be incrementally refreshed. For example, QEMV requests a full refresh by including the clause "REFRESH COMPLETE". To determine whether an incremental refresh was requested, materialized view creator 110 examines QEMV to determine whether it includes the clause "REFRESH FAST".

A determination of whether incremental refresh criteria is satisfied is made regardless of whether an incremental refresh was requested. A reason for doing this is that, in general, if a materialized view definition satisfies incremental refresh criteria, materialized view creator 110 can analyze the definition sufficiently to generate refresh code at a relational level, whether the refresh code is incremental refresh code or full refresh code. In this way, both full refresh code as well as incremental refresh code may be executed more efficiently.

If an incremental refresh has been requested, then control flows to step 520. Otherwise, control flows to step 524.

At step 520, it is determined whether there is a valid materialized view log for the base table(s) of the requested materialized view. The process of determining whether there is a valid materialized view log for the base table(s) is referred to as validation. Validation of a materialized view log involves examining database metadata 130 to determine (1) whether the metadata defines a materialized view log for the base table(s) and (2) whether the materialized view log has the columns needed to incrementally refresh the materialized view. If it is determined that there is a valid materialized view log for the base table(s), then control flows to step 524.

If it is determined there is not a valid materialized view log for the base table(s), then execution of the steps ends. Object-relational DBMS 101 may transmit an error message to the issuer of the DDL statement requesting the materialized view. Thus, to create an object-oriented materialized view that may be incrementally refreshed, a materialized view log should be created before issuing the DDL statement to define the materialized view. In other embodiments, the step of creating a materialized view log may be performed automatically as part of the process for creating a materialized view. In such embodiments, step 520 is of course not needed.

At step 524, materialized view creator 110 creates the container table for the materialized view. The type that is created depends on the type of object-oriented materialized view requested and the types of columns needed for the object-oriented materialized view. The select-clause of the materialized view query in QEMV defines the columns of EMPLOYEE_MV; these include ADDRESS_EMP_MV and at least one relational column. Therefore, the container table is an object-relational table. Materialized view creator 110 may create EMPLOYEE_EMP_MV by issuing the follow database command QCMV.

Create table EMPLOYEE_MV
(ADDRESS_EMP_MV Address
[list of column definitions]
)

The clause "[list of column definitions]" is the list of columns and their column type, where the list includes columns listed by the clause [list of columns] in QEMV received at step 510.

At step 528, materialized view creator 110 creates relational level incremental refresh code and stores it in database metadata 130, if it has been determined that incremental refresh has been requested at step 518.

At step 532, materialized view creator 110 creates relational level full refresh code and stores it in database metadata 130.

At step 536, materialized view creator 110 populates the materialized view. To populate the materialized view, materialized view creator 110 generates a database insert command according to the following format.

Insert into EMPLOYEE_MV ([insert columns])
[relational materialized view query]

The clause [relational materialized view query] refers to the relational level query generated based on the materialized view query in the DDL command received at step 510. The clause ([insert columns]) refers to columns of the container table. Execution of the steps ceases.

If at step 514, it is determined that incremental refresh criteria is not satisfied, then control flows to step 540. At this step, materialized view creator 110 may create and populate the container table by issuing the following database command.

Create table EMPLOYEE_EMP_Mv as select
ADDRESS_EMP
ADDRESS_EMV [list of columns]
from EMPLOYEE.

At step 550, materialized view creator 110 creates full refresh code for the object-oriented materialized view. After step 550, execution of the steps cease.

Object-Oriented Materialized Views of Base Object Tables

In addition to creating object-relational materialized views of object-relational tables, object-relational materialized views of object tables may be created. Even more, object materialized views may have as base tables object-relational tables, object tables, and relational tables.

Figure 5C:
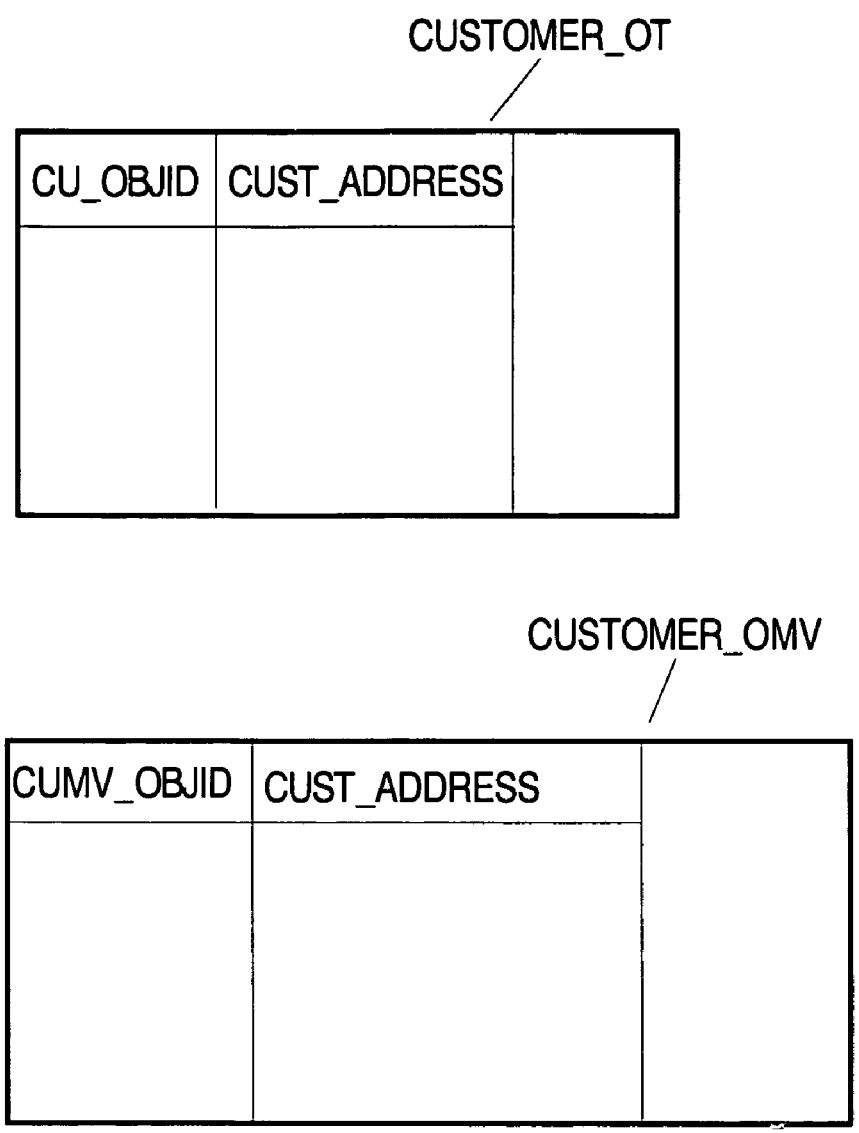
FIG. 5C is a block diagram depicting a base table and object materialized view according to an embodiment of the present invention.

To illustrate creating object-oriented materialized views of object tables, the database objects in FIG. 5C are provided.

Referring to FIG. 5C, it shows object table CUSTOMER_OT, which contains instances of the object class Person. CUSTOMER_OT contains attribute columns for each attribute Person, including object column CUST_ADDRESS, which is of the object class Address. Other attribute columns of CUSTOMER_OT are not shown in FIG. 5C. CUSTOMER_OT also contains CU_OBJID, an object id column whose values are automatically generated by object-relational DBMS 101. CUSTOMER_OMV is an object materialized view of CUSTOMER_OT. CUSTOMER_OMV includes columns CUMV_OBJID and CUST_ADDR, which correspond to base attributes CU_OBJID and CUST_ADDRESS respectively.

To create an object materialized view CUSTOMER_OMV of the type Person, the following database command QCMEMP1 may be used.

create materialized view CUSTOMER_OMV of Person as select * from CUSTOMER_OT

The clause "of Person" specifies to materialized view creator 110 to create an object materialized view. Thus, at step 524, materialized view creator 110 issues the following database command QCTEMP1 to create the container table as follows.

create table CUSTOMER_OMV of Person

In an embodiment of the present invention, it is required that all attributes be selected in the select clause of the materialized view query contained in QCTEMP1. The reason for this requirement is that CUSTOMER_OMV and CUSTOMER contain objects of the same type, and thus should have the same attributes.

An object-relational materialized view of an object table may be created by omitting the "of Person" from QCTEMP1. For example, the following database command QCTEMP2 is used to create and initially populate an object-relational table CUSTOMER_ORMV.

create materialized view CUSTOMER_ORMV as select * from CUSTOMER_OT

At step 524, materialized view creator 110 issues the following database command QCTEMP2 to create the containing object-relational table CUSTOMER_ORMV.

create table CUSTOMER_ORMV
(CUST_ADDRESS Address,
[list of column definitions])

The clause '[list of column definitions]' refers to a list of column definitions that define columns that correspond to those in CUSTOMER_OT. Thus, object-relational DBMS 101 defines CUSTOMER_ORMV as an object-relational table, with columns corresponding to base attributes of the object table, including an object column CUST_ADDRESS. An object-relational materialized view does not have to have a column for each base attribute of the object table.

An object materialized view may be created from base tables that are object-relational or relational. For example, the following database command QCMEMP3 is used to create an object table EMPLOYEE_OVMV from object-relational table EMPLOYEE.

create materialized view EMPLOYEE_OVMV of Person select * from EMPLOYEE In an embodiment of the present invention, it is required that the select clause of the query contained in QCTEMP1 reference a base attribute for every attribute defined by the object class. The reason for this requirement is that EMPLOYEE_OVMV contains instances of the object class, each of which requires a corresponding base attribute from object table EMPLOYEE.

At step 524, materialized view creator 110 issues the following database command QCTEMP3 to object-relational DBMS 101 to create the container table for EMPLOYEE_OVMV.

create table EMPLOYEE_OVMV of Person

Object References

Another object-oriented feature supported by object-relational DBMS 101 is a column type referred to as an object reference. An object reference identifies an object and is used to locate the object. An object reference may contain some information that specifies where the object resides, such as data that identifies the particular object table in which an object resides.

An object reference column may contain object references that refer to one object in a set of multiple object tables. The set may reside in multiple DBMSs. Examples of object references are discussed in References That Indicate Where Global Database Objects Reside.

On the other hand, an object reference column may contain object reference values that refer only to objects within a single object table. The object reference column is referred to as being scoped to the object table. The single table is referred to as the scope of the object for the object reference column. The scope of an object reference column is specified by a DDL command used to define the object reference column, as shall be explained in greater detail.

Figure 6A:
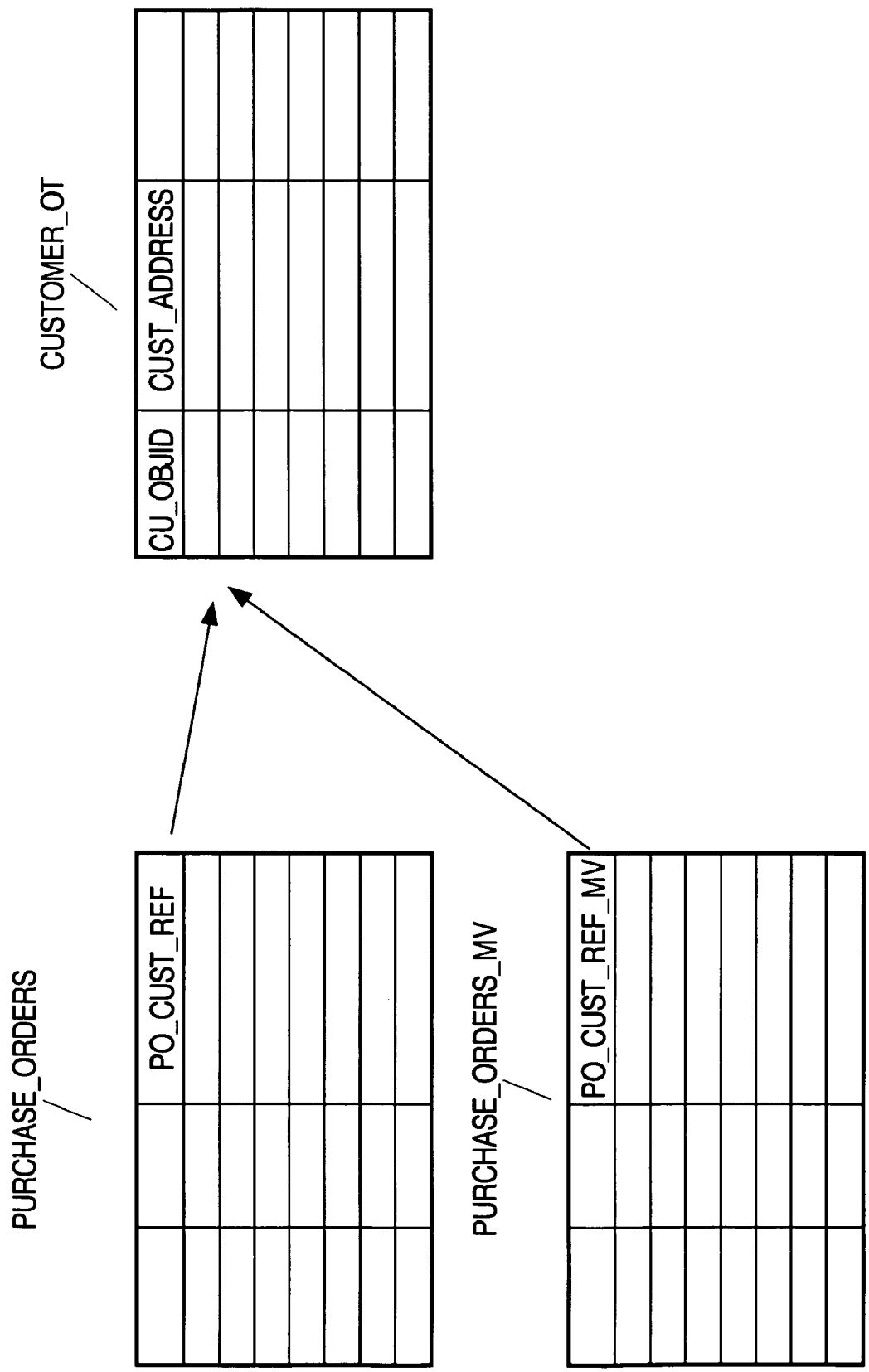
FIG. 6A is a block diagram depicting a base table and object materialized view containing object references referring to objects in an object table according to an embodiment of the present invention.

FIG. 6A is a block diagram depicting database objects used to illustrate object references. Referring to FIG. 6A, it shows object table CUSTOMER_OT, object-relational table PURCHASE_ORDERS, and object-relational materialized view PURCHASE_ORDERS_MV.

PURCHASE_ORDERS includes PO_CUST_REF, which is an object reference whose scope is CUSTOMER_OT. PURCHASE_ORDERS also includes other columns not shown. The following database command QPO is used to define PURCHASE_ORDERS.

create table PURCHASE_ORDERS
    (PO_CUST_REF REF Person,
    [other columns]
    )
    Scope for (PO_CUST_REF) is CUSTOMER_OT)

The clause "Scope for (PO_CUST_REF) is CUSTOMER_OT)" is an example of a scope-for clause, which is used to define a scope for an object reference column. The scope-for clause of QPO, in particular, sets the scope of PO_CUST_REF to CUSTOMER_OT.

PURCHASE_ORDERS is a base table for object-relational materialized view PURCHASE_ORDERS_MV. PURCHASE_ORDERS_MV includes PO_CUST_REF_MV, whose base columm is PO_CUST_REF. The scope-for for PO_CUST_REF_MV is identical to that of PO_CUST_REF. PURCHASE_ORDERS_MV includes other columns not shown. PURCHASE_ORDERS_MV is defined by the following database command QPOMV1.

create materialized view PURCHASE_ORDERS_Mv as select PO_CUST_REF PO_CUST_REF_Mv
    [list of other columns]
    from PURCHASE_ORDERS QPOMV1 does not contain a scope-for clause. The absence of the scope-for clause specifies that the scope of PO_CUST_REF_MV is the same as its base attribute PO_CUST_REF. Thus an object reference in PO_CUST_REF_MV refers to an object in the base table CUSTOMER_OT.

Figure 6B:
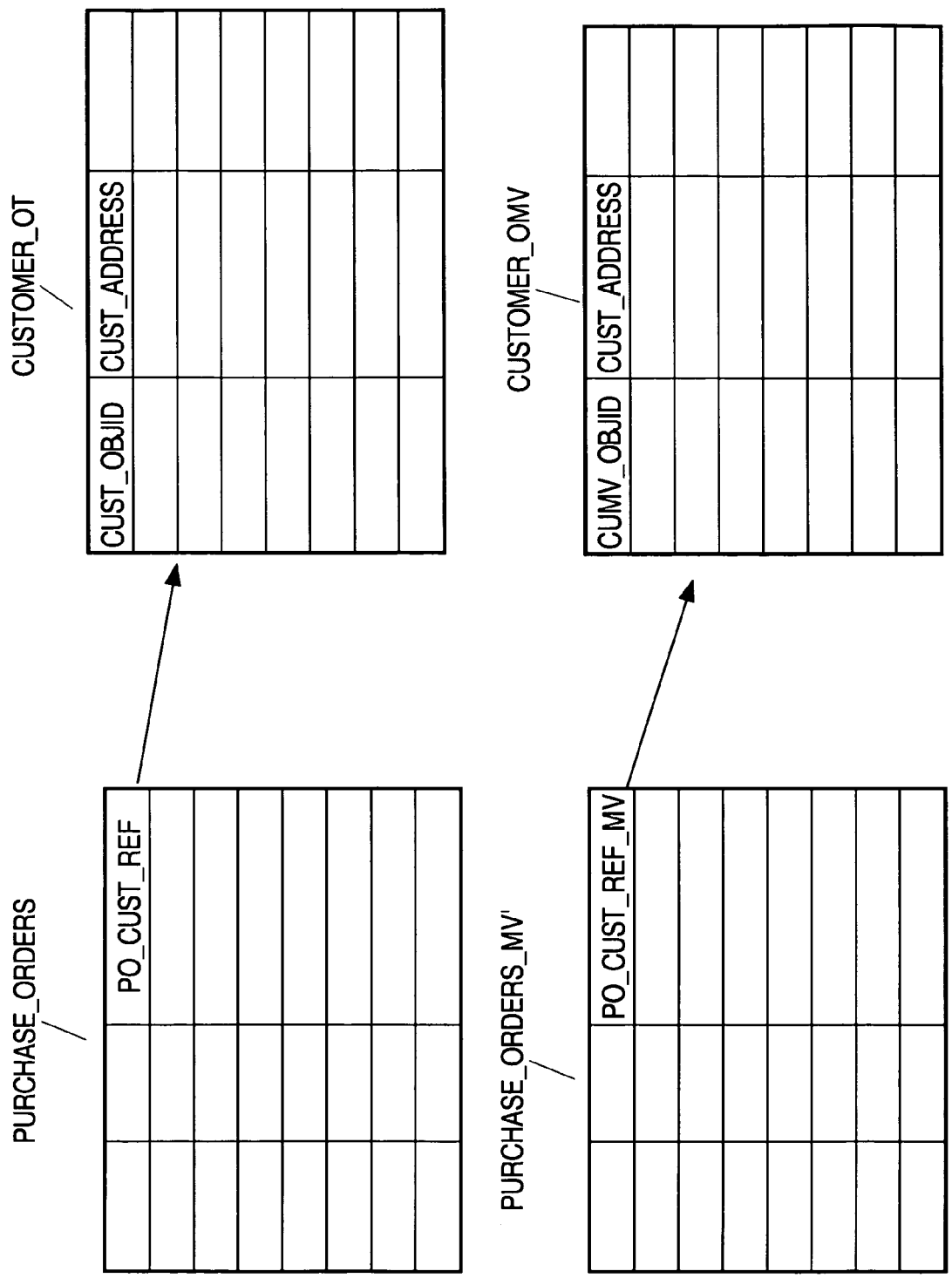
FIG. 6B is a block diagram depicting a base table and object materialized view containing object references referring to objects in different object tables according to an embodiment of the present invention.

FIG. 6B depicts database objects used to illustrate how the scope of an object reference column in object-relational materialized views may differ from its corresponding base column. Referring to FIG. 6B, it also shows CUSTOMER_OT, and PURCHASE_ORDERS.

In addition, FIG. 6B shows object materialized view CUSTOMER_OMV. The base table of CUSTOMER_OMV is CUSTUMER_OT.

PURCHASE_ORDERS_MV is an object-relational view of base table PURCHASE_ORDERS. Similar to object reference column PO_CUST_REF_MV in PURCHASE_ORDERS_MV, PURCHASE_ORDERS_MV contains an object reference column PO_CUST_REF_MV whose base attribute is PO_CUST_REF. However, the scope of PO_CUST_REF_MV is different. The scope of PO_CUST_REF_MV is CUSTOMER_OMV.

PURCHASE_ORDERS_MV is defined by the following database command QPOMV2.

create materialized view PURCHASE_ORDERS_Mv (scope for (PO_CUST_REF_MV) is CUSTOMER_OMV)
    as select PO_CUST_REF PO_CUST_REF_MV
    [list of other columns]
    from PURCHASE_ORDER When materialized view creator 110 receives QPOMV2, it issues the following database command QPOMVT.

create table PURCHASE_ORDERS_MV
    ([list of column definitions],
    scope for (PO_CUST_REF_MV) is CUSTOMER_OMV)

The clause '[list of column definitions]' refers to a list of column definitions that define columns that correspond to those in PURCHASE_ORDERS.

Object reference values in PO_CUST_REF may contain location information to objects in CUSTOMER_OT. In this case, object-relational DBMS 101 modifies object reference values PO_CUST_REF_MV so that they refer to the location of the corresponding object in CUSTOMER_OMV.

Nested Tables

Figure 7A:
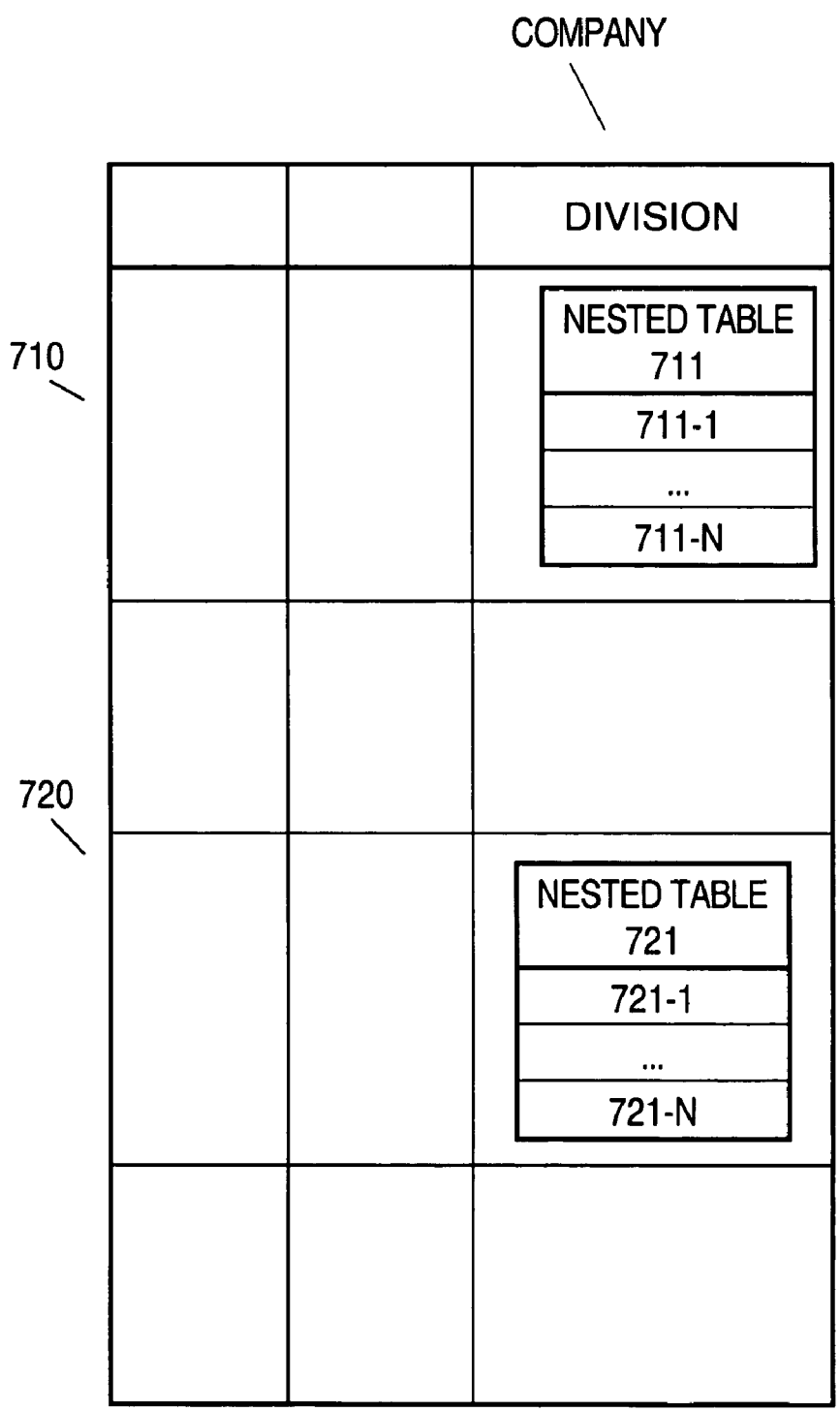
FIG. 7A is a block diagram depicting an object-relational table containing nested tables according to an embodiment of the present invention.

A nested table is a column object typed as a table with an unbounded number of object entries. FIG. 7A shows a logical representation of an object table that includes a nested table column.

Referring to FIG. 7A, it shows object table COMPANY. Object table COMPANY includes column DIVISION, a nested table column. Each row of object table COMPANY contains a nested table. For example, object 710 in object table COMPANY contains nested table 711. which contains a collection of nest table objects 711-1 to 711-N. Object 720 of object table COMPANY contains nested table 721, which contains a collection of nest table objects 721-1 to 721-N. The nested table objects in the nested tables in column DIVISION are referred to as being contained in the column.

Nested tables 721 and 722 may be abstracted to the user as separate tables; queries may be issued against them individually. However, in an embodiment of the present invention, object-relational DBMS 101 stores nested objects for all the nested tables together in one internal table.

Figure 7B:
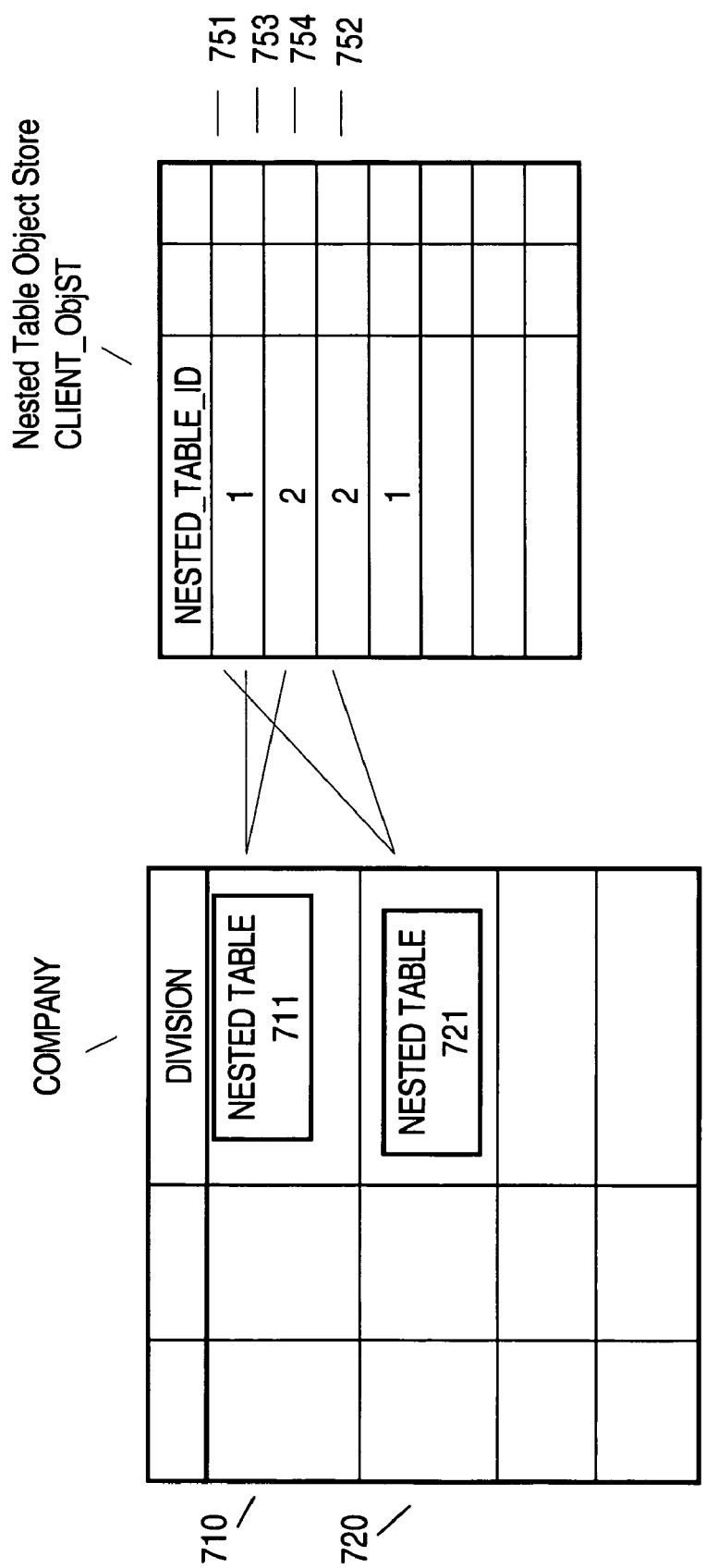
FIG. 7B is a block diagram depicting an object-relational table containing nested tables and a table used to store nested table objects according to an embodiment of the present invention.

FIG. 7B is a block diagram showing such a mechanism. Referring to FIG. 7B, it also shows object table CLIENT. In addition, FIG. 7B shows nested table object store CLIENT_ObjST, which stores objects that reside in the nested table objects contained in column DIVISION. CLIENT_ObjST is a table containing a column for the attributes of the nested table objects in DIVISION. Rows in CLIENT_ObjST each correspond to a nested table object in DIVISION, and store attribute values for their corresponding nested table object. These columns are not shown. Also, not all rows for CLIENT_ObjST are shown. CLIENT is referred to as a parent table with respect to CLIENT_ObjST because CLIENT_ObjST holds the nested table objects that are logically contained by CLIENT.

In addition, CLIENT_ObjST contains column NESTED_TABLE_ID, which contains values that identify a particular nested table within DIVISION. The value '1' in column NESTED_TABLE_ID of rows 751 and 752 identify nested table 711; rows 751 and 752 correspond to nested table objects 711-1 and 711-N, respectively. The value '2' in column NESTED_TABLE_ID of rows 753 and 754 identify nested table 721; rows 753 and 754 correspond to nested table object 751-1 and 751-N, respectively. There are rows in CLIENT_ObjST that correspond to other nested table objects in nested table 711 and 721 that are not shown.

Nested tables are described in greater detail in *Apparatus and Method for Storage of Object Collections in a DBMS*.

When creating a materialized view of a table having a nested table column, at least two container tables are created for the materialized view—a "parent" container table that has a nested table column containing the nested tables, and another container table that contains the nested objects contained the in the nested tables.

FIG. 7C shows an example of such tables created for a materialized view of COMPANY. FIG. 7C shows materialized view COMPANY_MV, which includes container table COMPANY_MVT and nested table object store CLIENT_ObjST_MV. COMPANY_MVT holds objects from base object table COMPANY. The nested table objects for the objects in object table COMPANY_MVT are stored in CLIENT_ObjST_MV. A nested table object store for a materialized view is referred to herein as a secondary materialized view. Secondary materialized views are internal; thus, they cannot be accessed by a user.

The following database command QONT may be used to create materialized view COMPANY_MV.

create materialized view COMPANY_MV as select * from COMPANY

In response to receiving QONT, materialized view creator 110 follows a process of creating materialized views that is recursive. Materialized view creator 110 not only creates a parent container table for the materialized view, but also a container table for the secondary materialized view. It is possible for a nested table to itself contain another nested table. Materialized view creator 110 creates a secondary materialized view for the other nested table. For any secondary materialized view created by materialized view creator 110, materialized view creator 110 creates metadata that defines the secondary materialized view, and the refresh code needed to refresh it.

In this illustration, in response to receiving QONT, at step 524 materialized view creator 110 generates and issues the following database command QOCT.

create table COMPANY_MVT
    ([list of column definitions])

The clause '[list of column definitions]' refers to a list of column definitions that define columns that correspond to those in COMPANY. Object-relational DBMS 101 responds to receiving QOCT by creating COMPANY_MVT and CLIENT_ObjST_MV. CLIENT_ObjST_MV is a system generated name. In this illustration, the system generated name is similar to its corresponding base object store table for purposes of clarity. When object-relational DBMS 101 receives a DDL command defining a table with a nested table column, object-relational DBMS 101 creates containing tables for all the secondary materialized views that stem from the parent container table.

After issuing QOCT to create the container tables, materialized view creator 110 then creates the metadata that defines CLIENT_ObjST_MV as a secondary materialized view. The metadata also includes the refresh code for CLIENT_ObjST_MV.

Refreshing Materialized View with Nested Tables

The process of refreshing materialized views is also recursive. When a materialized view is fully refreshed, the secondary materialized views that stem from the materialized view are fully refreshed. Likewise, when a materialized view is incrementally refreshed, so too are all the secondary materialized views that stem from the materialized view. In general, when materialized view refresher 120 executes the refresh code of a materialized view, it recursively executes the refresh code for the secondary materialized views, if any.

When an incremental refresh is requested for a requested materialized view, materialized creator 110 not only validates the materialized view log for the parent base table, but also the materialized view log for each nested table object store that stems from the parent base table. The process of validation is performed recursively. That is, if the parent base table contains nested tables that also contain another nested table, the materialized view log for the other nested table is validated as well.

Incremental refresh code is generated for each of the secondary materialized views. The incremental refresh code for a secondary materialized view references its materialized view log for the corresponding nested table object store. Thus, a secondary materialized view is incrementally refreshed based on changes recorded in its materialized view log.

The present invention has been illustrated using particular types of object columns. However, the present invention is not limited to these types of object columns. For example, materialized views may be created that contain a VARRAY (variable length array) column. A VARRAY is an array with a maximum number of elements. Each element of the array belongs to the same data type. The data types to which an element may belong include user specified object classes and scalar types.

Hardware Overview

Figure 8:
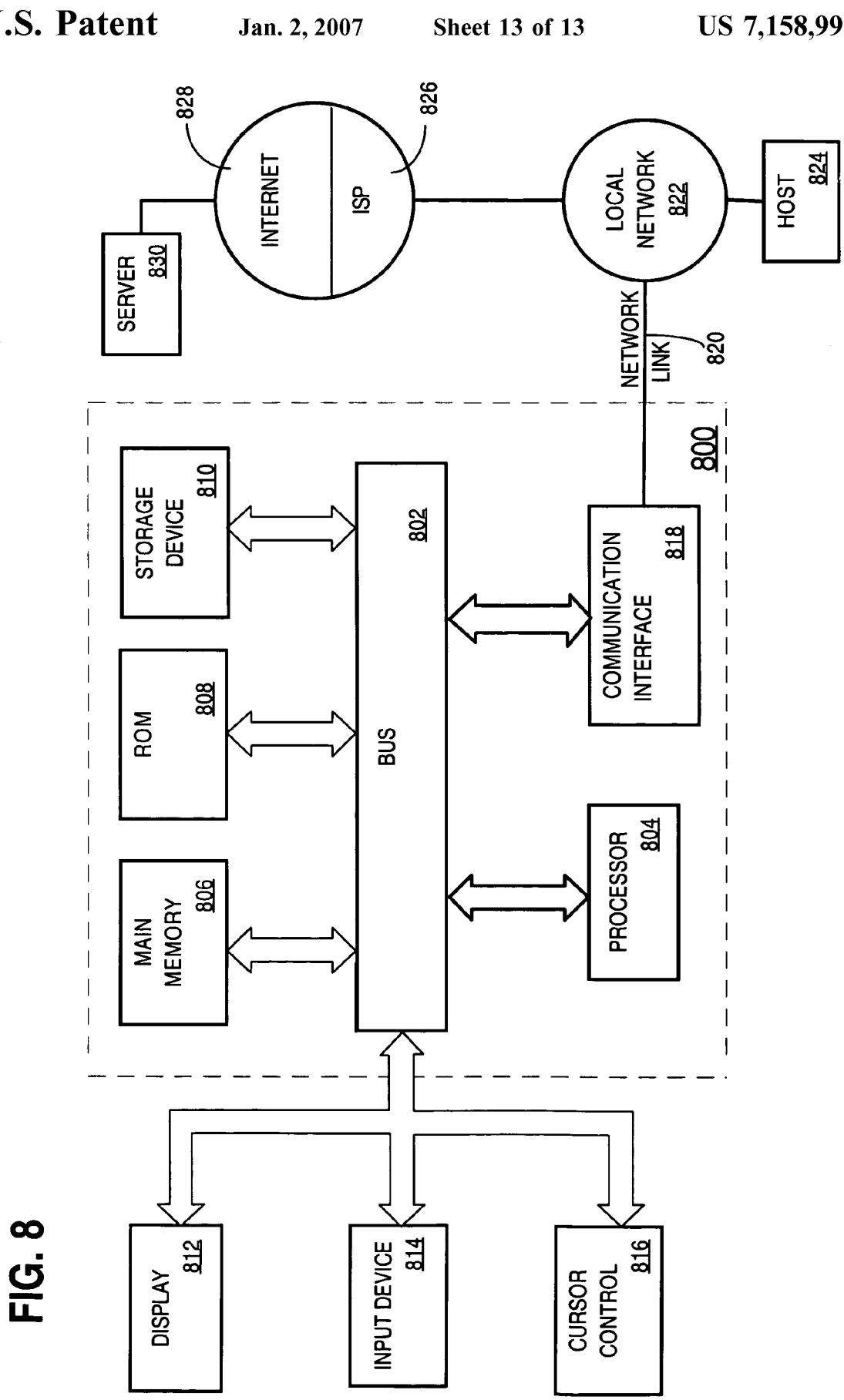
FIG. 8 is a block diagram of a computer system that may be used to implement an embodiment of the present invention.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method, the method comprising the steps of:
   a database management system receiving a request to generate a materialized view that contains objects of an object class;
   in response to receiving said request, said database management system creating said materialized view;
   said database management system performing operations on said objects as instances of said object class;
   wherein said object class defines attributes and one or more routines to invoke to operate on the state of the objects of said object class;
   wherein attribute values of an object contained in said materialized view are derived from one or more base tables;
   wherein the step of creating said materialized view includes creating a container table, separate from said one or more base tables, that includes corresponding columns that correspond to said attributes and that hold the attribute values of said attributes; and
   storing said attribute values of said attributes in said container table.

2. The method of claim 1, wherein the step of creating said materialized view includes the step of creating an object materialized view, wherein said object materialized view is associated with an object class and contains instances of said object class that correspond to rows of said object materialized view.

3. The method of claim 1, wherein the step of creating said materialized view includes creating an object-relational view that includes at least one object column.

4. The method of claim 1, wherein the method further includes the step of receiving another request from a user requesting performance of said operations on said objects as instances of said object class.

5. The method of claim 1, wherein the step of said database management system performing operations includes performing an operation on said objects by invoking a routine defined by said object class.

6. The method of claim 1, further including the step of said database management system generating refresh code that refreshes said materialized view.

7. The method of claim 1, further including the step of generating refresh code that may be executed to fully refresh said materialized view.

8. The method of claim 1, further including the step of generating refresh code that refreshes said materialized view based on modifications to the one or more base tables.

9. The method of claim 8, wherein the step of generating refresh code includes the step of generating refresh code that references said corresponding columns but not as said attributes of said object class.

10. The method of claim 1, wherein said materialized view includes an object column that has a plurality of nested tables that contain nested table objects.

11. The method of claim 10, wherein the step of creating said materialized view includes the step of creating another table that holds attributes of nested table objects of said plurality of nested tables.

12. The method of claim 1, wherein:
a base table of said one or more base tables includes a base column typed as an object reference; and
wherein the step of creating said materialized view includes creating a particular column of said container table that:
corresponds to said base column, and is typed as an object reference.

13. The method of claim 12, wherein:
a first scope of said base column is a first set of tables; and
the particular column has a second scope that is different than said first scope.

14. The method of claim 13, wherein the second scope is another materialized view based on said first set of tables.

15. A computer-readable storage medium storing one or more sequences of instructions which, when executed by one or more processors, causes the one or more processors to perform the method recited in claim 1.

16. A computer-readable storage medium storing one or more sequences of instructions which, when executed by one or more processors, causes the one or more processors to perform the method recited in claim 2.

17. A computer-readable storage medium storing one or more sequences of instructions which, when executed by one or more processors, causes the one or more processors to perform the method recited in claim 3.

18. A computer-readable storage medium storing one or more sequences of instructions which, when executed by one or more processors, causes the one or more processors to perform the method recited in claim 4.

19. A computer-readable storage medium storing one or more sequences of instructions which, when executed by one or more processors, causes the one or more processors to perform the method recited in claim 5.

20. A computer-readable storage medium storing one or more sequences of instructions which, when executed by one or more processors, causes the one or more processors to perform the method recited in claim 6.

21. A computer-readable storage medium storing one or more sequences of instructions which, when executed by one or more processors, causes the one or more processors to perform the method recited in claim 7.

22. A computer-readable storage medium storing one or more sequences of instructions which, when executed by one or more processors, causes the one or more processors to perform the method recited in claim 8.

23. A computer-readable storage medium storing one or more sequences of instructions which, when executed by one or more processors, causes the one or more processors to perform the method recited in claim 9.

24. A computer-readable storage medium storing one or more sequences of instructions which, when executed by one or more processors, causes the one or more processors to perform the method recited in claim 10.

25. A computer-readable storage medium storing one or more sequences of instructions which, when executed by one or more processors, causes the one or more processors to perform the method recited in claim 11.

26. A computer-readable storage medium storing one or more sequences of instructions which, when executed by one or more processors, causes the one or more processors to perform the method recited in claim 12.

27. A computer-readable storage medium storing one or more sequences of instructions which, when executed by one or more processors, causes the one or more processors to perform the method recited in claim 13.

28. A computer-readable storage medium storing one or more sequences of instructions which, when executed by one or more processors, causes the one or more processors to perform the method recited in claim 14.

* * * * *